Aug. 21, 1934.  E. N. SNODGRASS  1,970,712
APPARATUS FOR CONFECTION MANUFACTURE
Filed May 4, 1932  3 Sheets-Sheet 1

INVENTOR
EDWARD N. SNODGRASS
BY
ATTORNEY

Aug. 21, 1934.    E. N. SNODGRASS    1,970,712
APPARATUS FOR CONFECTION MANUFACTURE
Filed May 4, 1932    3 Sheets-Sheet 2
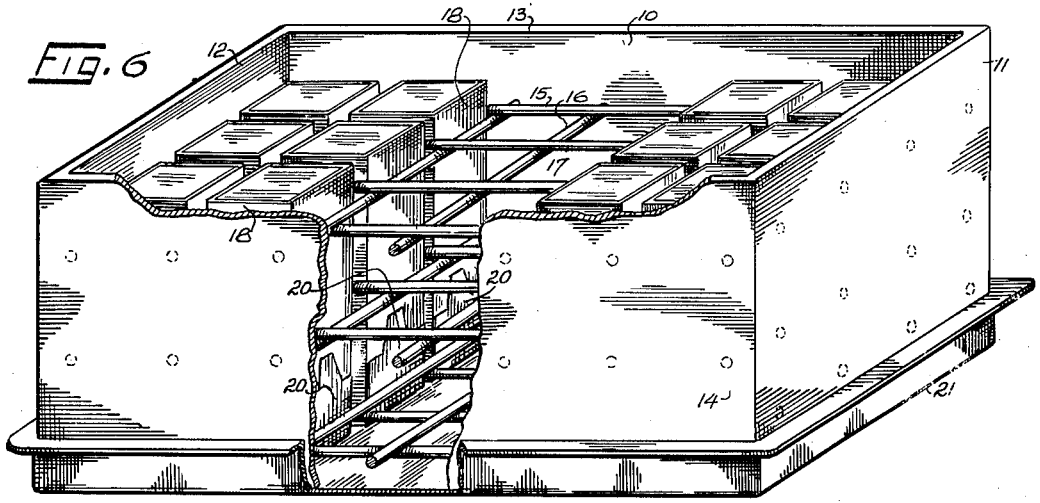
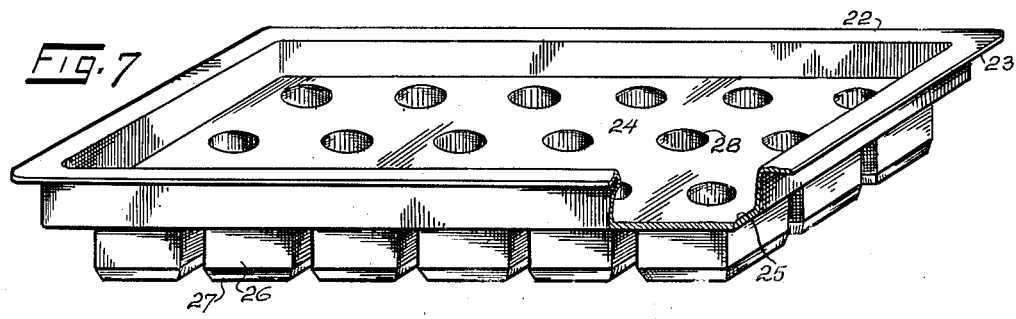
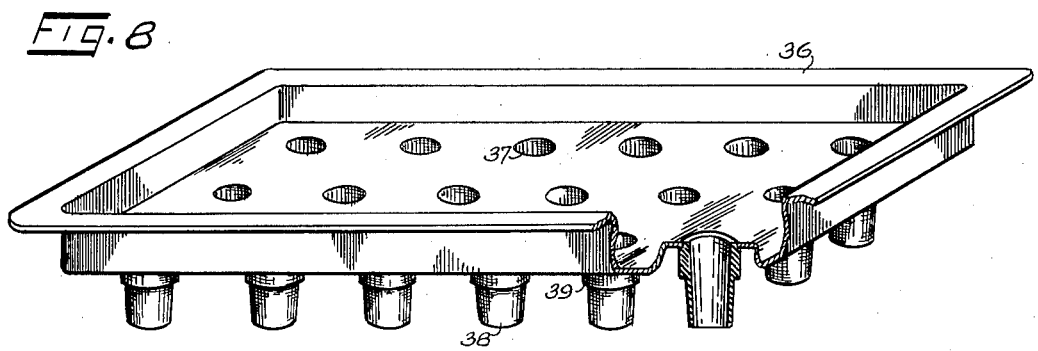
INVENTOR
EDWARD N. SNODGRASS
BY *Harry P. Roberts*
ATTORNEY Aug. 21, 1934.  E. N. SNODGRASS  1,970,712
APPARATUS FOR CONFECTION MANUFACTURE
Filed May 4, 1932   3 Sheets-Sheet 3
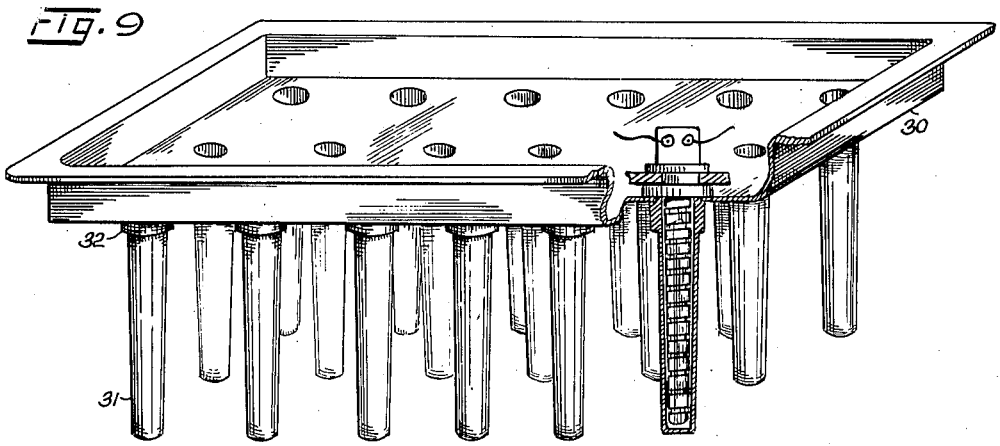
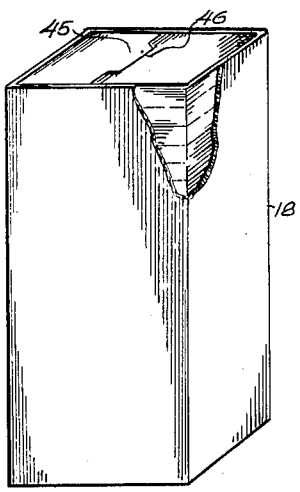
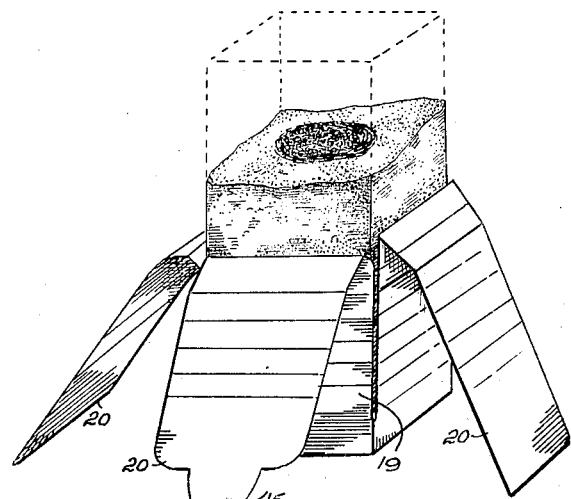
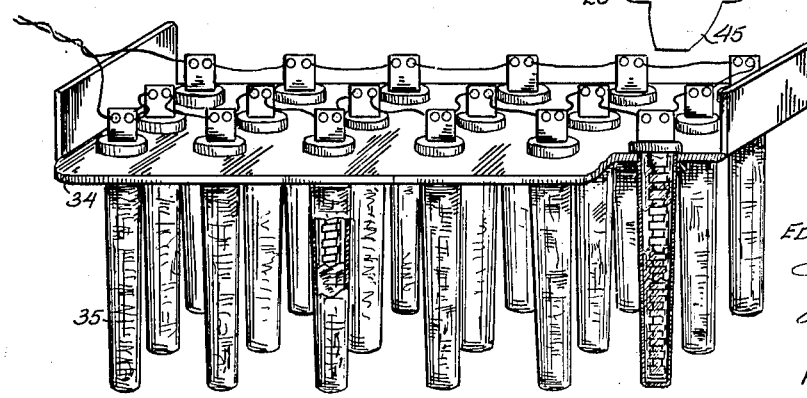
INVENTOR
EDWARD N. SNODGRASS
ATTORNEY Patented Aug. 21, 1934

1,970,712

UNITED STATES PATENT OFFICE 1,970,712

APPARATUS FOR CONFECTION MANUFACTURE

Edward Norman Snodgrass, Denver, Colo., assignor to Norman Confection, Inc., Denver, Colo., a corporation of Colorado Application May 4, 1932, Serial No. 609,076

3 Claims. (Cl. 107—19)

This invention relates to method of and apparatus for the manufacture of confections and more particularly to ice cream confections, although certain features thereof may be employed with equal advantage for other purposes.

It contemplates more especially the provision of a sequence of steps and apparatus for effecting the production of a normally unstable confection on a commercial scale so as to simplify and render more practical an enterprise of this character.

Numerous types of normally unstable confections have heretofore been proposed, but these have not proven very practical nor commercially possible owing to the inability to produce such within economy requirements. Known methods as well as apparatus for the production of normally unstable confections are entirely too complicated, expensive and prove too intricate. Ice cream manufacturers have limited capacity and financial resources so that expensive methods of confection production are entirely beyond their possible adoption. Then, too, the sales volume for individual manufacturers does not warrant resort to expensive and automatic equipment which may be utilized to accomplish a similar end, and in fact known devices of an automatic type have a less over-all efficiency than most simple methods and apparatus which meet the requirement without encumbering the overhead incident to the production of such confections.

One object of the present invention is to provide a novel and simple method of producing normally unstable confections on a production basis.

Another object is to provide a simple and comparatively inexpensive device which mechanically produces ice cream confections without requiring any burdensome capital investment.

Still another object is to provide a simple and effective device for moulding ice cream and similar materials into a preformed body having the interior capable of confining a liquid filler.

A further object is to provide an improved method for facilitating a normally unstable confection preparation with minimum entailment of time and expense.

Still a further object is to provide a simple and effective device for processing normally unstable confections on a production basis.

A still further object is to provide a novel method of moulding the constituent elements of a normally unstable confection for preparation on a commercial scale with minimum entailment of time and labor.

Still a further object is to provide a sequence of steps which convert normally liquid materials into a substantially solid confection having a liquid interior to impart improved taste characteristics thereto.

Other objects and advantages will appear from the following description of an illustrative embodiment of the present invention.

In the drawings:

Figure 6 is a perspective view of the device shown in Figures 1 and 5 minus the top member, it being shown in an inverted position for enabling the initial introduction of the containers therein.

Figure 7 is a perspective view of the top member shown in operative position in Figure 1.

Figure 8 is a perspective view of another top member shown in operative position in Figure 3.

Figure 9 is a perspective view of another top member shown in operative position in Figure 2.

Figure 10 is a perspective view of a heating element that is complemental to the top member disclosed in Figure 9 for slightly elevating the temperature thereof in order to enable convenient removal from a frozen substance.

Figure 11 is a perspective view of a confection confining carton, parts thereof being broken away to clarify the showing.

Figure 12 is a perspective view of the confection partially consumed with the container progressively removed therefrom to enable consumption from the fingers without resort to spoons, dishes or other eating implements.

Figure 1:
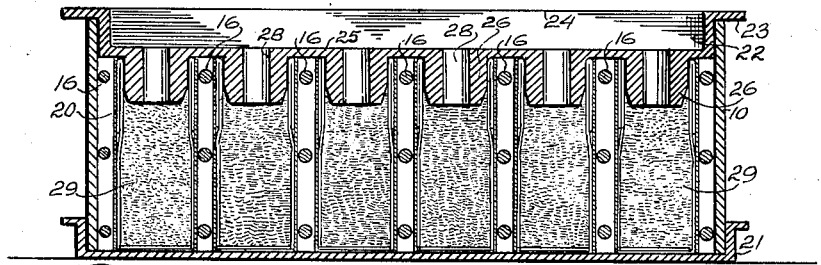
Figure 1 is a sectional view in elevation of an apparatus capable of performing the initial step in the preparation of a confection of the character mentioned.

The structure selected for illustration comprises a substantially rectangular body or casing 10 defined by upstanding parallel sides 11—12 and 13—14. The casing 10 may be constructed from any suitable material such as aluminum, German silver or the like, and a plurality of cross-rods 15—16 extend between the walls 11—12 and 13—14, respectively, to define substantially square pockets 17 therein. To this end, the rods 15 and 16 are arranged in vertical alignment for the entire depth of the walls 11 of the casing 10, and are laterally spread in parallelism to define a plurality of pockets 17 for the reception of suitable moulds such as cartons 18 therein. The cartons 18 are more specifically described in applicant's co-pending application serially numbered 602,712 and filed April 2, 1932, although these may be varied within a wide range and specially constructed moulds substituted in lieu thereof.

The cartons 18 are assembled with their liners 19 confined therein. The flanges 20 of the liners 19 overlap around the exterior of the carton 18 for application in the casing pockets 17 by telescopic projection therein with the open side down when the casing 10 is in its inverted position as shown in Figure 6. This presents the cartons 18 with their liners 20 in a vertically upright position for the reception of constituents therein by merely inverting the casing 10 for placement in the corresponding shaped pan 21 serving as a receptacle therefor. The initial step consists, then, of filling the casing pockets 17 with a corresponding number of cartons 18 having their open orifices or entrant regions standing upwardly in a manner disclosed in Figure 1. In this position, the casing 10 is provided with a top member 22 corresponding in configuration and dimensional extent with the interior thereof for placement therein and support in a predetermined position, it being apparent that the peripheral flange 23 of the top member 22 rests upon the edges of the casing 10 to regulate the telescopic application and degree of entrance of the top member 22 therein.

It is to be noted that the top member 22 is dished to present a chambered receptacle region 24, and the bottom 25 thereof is formed with a plurality of depending projections 26 shaped substantially to conform in size and configuration with the interiors of the cartons or containers 18 which are positioned in the casing pockets 17. The depending projections 26 are spaced to correspond with the spacing of the casing brackets 17, and these have beveled edges 27 formed thereon to more conveniently effect entrance within the open mouth or orifice of the containers or cartons 18. In order to enable the entry of liquids or other substances to the interior of the containers 18, cylindric passages 28 are provided axially through the projections 26 to establish communication with the chambered receptacle 24 of the top member 22. Liquids such as cream are poured in the top member 22 for confinement in the chambered portion 24 thereof with consequent flow through the passages 28 into the containers 18. Only sufficient liquids 29 are poured in the top member 22 so as to fill the cartons 18 up to the bottom surface 25.

Figure 2:
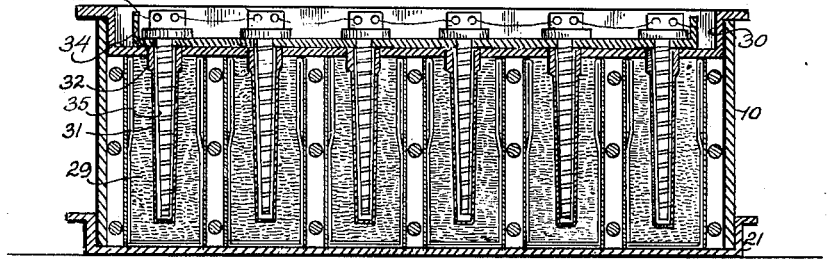
Figure 2 is a similar view in section of the device shown in Figure 1 with the top member thereof substituted to perform the second step of the continuous process.
Figure 3:
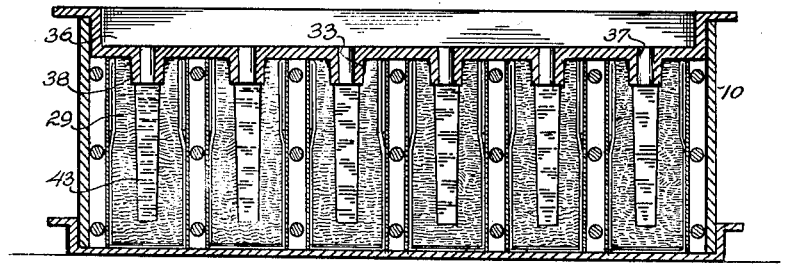
Figure 3 is a similar view in section of a device with another top member substituted so as to perform the third step in the production of the confection.
Figure 4:
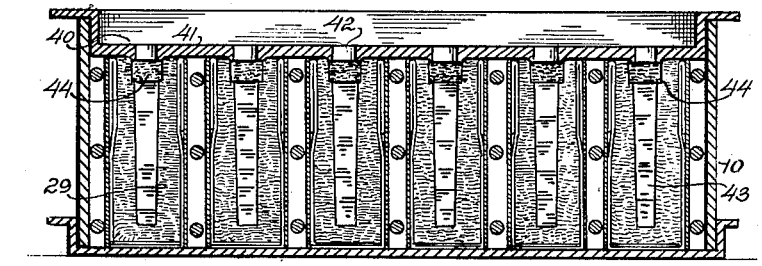
Figure 4 is a similar view in section of a device with the top member again substituted for performing the fourth step of the process for producing the confection.

It is desired to form a cavity or core in the container confining body defined by the liquid 29, and this is effected by substituting the top member 22 by another similarly shaped top member 30. The top member 30 is formed with a plurality of depending cavity forming members 31 which are substantially cylindrical in shape for extension in the downward direction to a position just short of the other end of the ice cream body 29. In order to enable the convenient removal of the cavity forming members 31, the walls thereof are slightly tapered to terminate in a peripheral shoulder 32 at its juncture at the top member 30. The cavity forming members 31 correspond in number and spacing with the axial passages 28 provided in the projections 26 of the other top member 22, and these form cavities in the bottom 29 just prior to the freezing or congealing thereof. With the top member 30 in position shown in Figure 2, the entire casing 10 including the bottom 21 and top member 20 is subjected to substantially reduced temperatures for the purpose of freezing the liquid 29. When the liquid such as cream 29 is frozen into ice cream, the cavities defined by the member 31 will be self-sustaining and form-retaining and in consequence thereof the top member 30 may be removed so as to render free access to the cavities 33. In order to enable the ready and effective removal of the cavity forming member 31 with the top member 30 any suitable heating devices may be applied thereto to slightly elevate the temperatures of the members 31 to soften the frozen cream in contact therewith. This may take the form of a plate 34 having a plurality of heating elements 35 depending therefrom for telescopic engagement with the interior of the cavity forming members 31 in a manner disclosed in Figure 2. The elevated temperatures responsive to the heating elements 35 may be effected by electrical energy or other forms of heat depending upon the dictates of commercial practice, and this may be varied with a wide range to suit particular conditions. In fact, it may be desired to merely provide a flat plate for effecting the elevated temperature thereof, for flat application to the receptacled surface of the top member 30. This will convey the heat by conduction to the cavity forming member 31 and the frozen cream in contact therewith sufficiently softened to enable the convenient and effective removal of the member 31 with the top 30.

It is to be noted that the shoulder 32 forms a corresponding enlargement in communication with the cavities 33, and the ice cream body 29 is now ready for the introduction of edible fillers in the cavities 33 thereof. To this end, another top member 36 similarly receptacled and shaped to correspond with the top member 23 is substituted by the top member 22 in telescopic connection with the casing 10. The top member 36 is provided with passages 37 through the bottom thereof to correspond with the passages 28 provided in the top member 22. Moreover, tubular projections 38 depend from the bottom of the top member 36 for communication with the passages 37 therein for axial registry with the previously formed cavities 33. The tubular projections 38 are shaped to correspond with the cavity forming members 31, but these are exceedingly shorter to project just sufficiently within the cavities 33 to serve as a guide for fluids supplied thereto. It is to be noted that the tubular projections 38 are provided with peripheral shoulders 39 to correspond in size, shape and position with the peripheral shoulders 32 formed on the members 31. In consequence thereof, the cavities will have an enlarged mouth region to receive the peripheral shoulders 39 and effect registry of the tubular projection 38 therewith. Suitable liquid fillers such as extracts are poured in the top member 36 to fill the cavities 33. It is to be noted that the peripheral shoulders 39 of the tubular projections 38 displace a sufficient volume of ice cream so as to accommodate the equivalent amount in extracts confined in the passages 37 for deposit in the cavities 38 responsive to the removal of the top member 36. Thus all of the cavities 33 are filled with suitable extracts or syrups to enhance taste characteristics of the resulting combination of substances. A similar top member 40 is telescopically provided on the casing 10, it having a bottom 41 thereof provided with apertures 42 in axial alignment with the cavities 33 formed in the ice cream body 29.

Ice cream is sufficiently molten to render it flowable and thereupon deposited in the top member 40 so as to fill the cavities 33 above the extract filler 43 provided therein. This allows an ice cream deposit 44 to seal the cavity 33 on all sides by virtue of its cohesion with the remaining ice cream body 29. The entire casing 43 is then subjected to freezing temperature so as to harden the ice cream deposit or closure 44 to render the cavity 33 completely enclosed on all sides for the confinement of the liquid extract or filler 43 therein. Thereupon the top member 40 is removed to render the cartons 18 removable with the confection 29 completely formed in the interior thereof. With the removal of the containers 18, the flaps 20 or the interior liner 19 are overlapped, and the cooperating tongues 45 and complemental slits 46 are interengaged to serve as a closure. In consequence, the plurality of individual confections are formed in the sequence of continuous steps, and the containers 18 thereof are resorted to as the mould to avoid unnecessary entailment of labor, time and apparatus in the production thereof.

It is to be noted that the projections 26 depending from the top member 22 occupy and displace a volume within the containers 18 that is equivalent to the volume of the cavities 33 formed by the members 31 depending from the top member 30. The peripheral shoulders 32 on the cavity forming members 31, serve to form an enlarged opening which is utilized by the peripheral shoulders 39 on the tubular projection 38 depending from the third top member 36. The enlarged opening in turn serves to receive the ice cream deposit 44 serving as a closure for the cavities 33 after the liquid fillers 43 are introduced therein. As a result, the amount of liquids that are furnished through the top members 22, 30 and 36 may be accurately measured, and the confections produced on a commercial scale with precision and lack of irregularities. Doubtless, the casing 10 may have any selected dimensional size so as to accommodate any number of pockets 17 for the production of a large number of confections in a single run. In fact, it is thought practical to provide at least three hundred pockets 17 in the casing 10 to accommodate a corresponding number of cartons 18, thereby enabling the production of three hundred confections in a single run.

Figure 5:
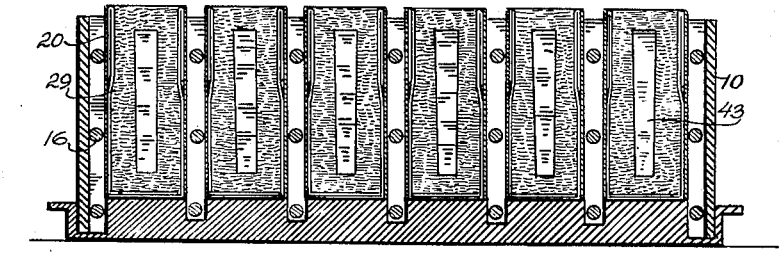
Figure 5 is a similar view in section of the device with the top member removed for enabling the removal of the resulting confections produced therein.

Suitable instrumentalities are provided to enable the application and removal of the top members 22, 30, 36 and 40 so that this may be effected with ease, rapidity and precision. The above description of a preferred embodiment of the invention illustrates a sequence of steps and apparatus that may be utilized to a distinct advantage in the production of ice cream confections having a tasty filler confined therein for consumption from the fingers without resort to dishes, spoons or other eating implements. The removal of the cartons 18 from the casing 10, is effected by placing such upon a plate member of the type disclosed in Figure 5, this comprising a surface rest having projections upstanding therefrom for registry with the bottoms of the containers 18. In all respects, the plate conforms with the construction of the top plate member 22 having the projections 26 formed thereon. In fact, the plate member 22 may be utilized for this purpose by reversing the position of initial use and resting the casing 10 thereon. The weight of the casing 10 will effect the extrusion of the containers 18 from the pockets 17 for displacement commensurate with the depth of the projections. Thereupon, the cartons 18 may be manually grasped for removal.

Various changes may be made in the embodiment of the invention herein specifically described without departing from or sacrificing any of the advantages of the invention as defined in the appended claims.

I claim:

1. In a device for moulding confections, the combination with a casing having a plurality of carton receiving compartments therein, of a top member removably associated with said casing, there being a plurality of openings in said top member for communication with each of the cartons positioned in said compartments, cavity forming projections depending from said top member into the open end of the cartons and terminating short of the bottom thereof, another top member having depending core forming members of elongated configuration positioned to axially extend into the cartons for substitution in the place of said first named top member, a flanged periphery on each of said top members to confine liquids for flow through said openings into the cartons.

2. In a device for moulding confections, the combination with a casing having a plurality of carton receiving compartments therein, of a top member removably associated with said casing, there being a plurality of openings in said top member for communication with each of the cartons positioned in said compartments, cavity forming projections depending from said top member into the open end of the cartons and terminating short of the bottom thereof, another top member having depending core forming members of elongated configuration positioned to axially extend into the cartons for substitution in the place of said first named top member, an additional top member having stub projections with bores therethrough for positioning on said casing in lieu of said last named top member to guide liquids for filling the cores previously formed with said last named top member, a flanged periphery on each of said top members to confine liquids for flow through said openings into the cartons.

3. In a device for moulding confections, the combination with a casing having a plurality of carton receiving compartments therein, of a top member removably associated with said casing, there being a plurality of openings in said top member for communication with each of the cartons positioned in said compartments, cavity forming projections depending from said top member into the open end of the cartons and terminating short of the bottom thereof, another top member having depending core forming members of elongated configuration positioned to axially extend into the cartons for substitution in the place of said first named top member, an additional top member having stub projections with bores therethrough for positioning on said casing in lieu of said last named top member to guide liquids for filling the cores previously formed with said last named top member, still another top member with a flat bottom having apertures therein for guiding liquids for sealing the filled cores, a flanged periphery on each of said top members to confine liquids for flow through said openings into the cartons.

EDWARD N. SNODGRASS.